W. Westlake.
Coffee Pot.
Nº 58,518.      Patented Oct. 2, 1866.
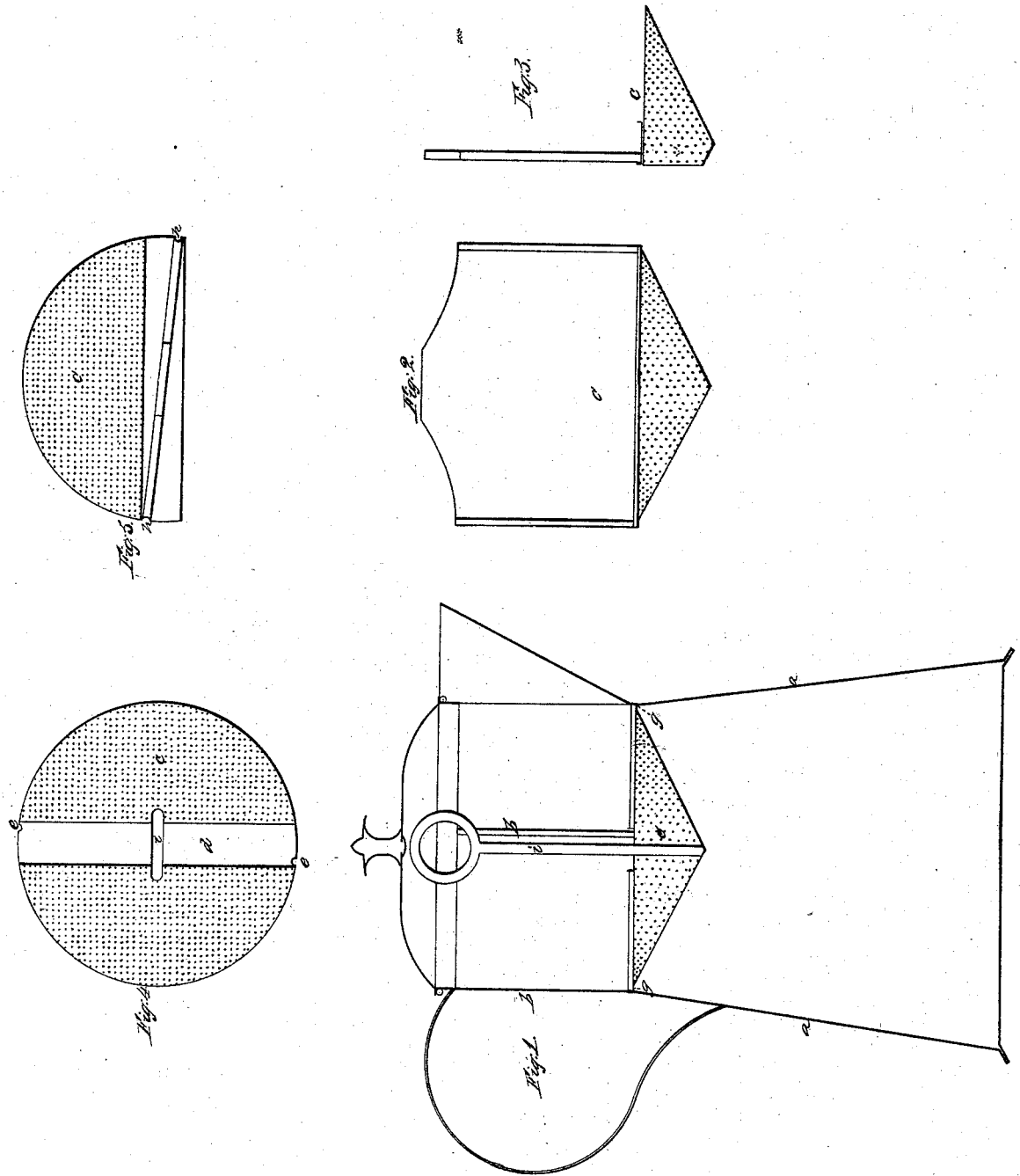
Witnesses:
T. Smith
L. Jones
Inventor:
Wm Westlake
by Atty Thos. P. Everett.

UNITED STATES PATENT OFFICE.

WILLIAM WESTLAKE, OF CHICAGO, ILLINOIS.

IMPROVEMENT IN COFFEE-POTS.

Specification forming part of Letters Patent No. 58,518, dated October 2, 1866.

*To all whom it may concern:*

Be it known that I, WILLIAM WESTLAKE, of the city of Chicago, in the State of Illinois, have invented a certain new and useful Improvement on Coffee-Pots; and I do hereby declare that the following is a full, clear, and exact description of the same, reference being had to the accompanying drawings, and to the letters and marks thereon.

Figure 1 of the drawings, which form part of this specification, is a vertical sectional view of a coffee-pot constructed under my improvement, Figs. 2, 3, 4, and 5 being views of scrapers and strainers used with the coffee-pot.

The body of the pot, for the lower and larger portion $a$, is of conical or tapering form, whereby the usual increase of surface at the bottom is secured for exposure to heat, while the lesser and upper portion, $b$, is cylindrical, the object of the cylindrical portion being for giving facility to the use of the combined scraper and strainer $c$.

In boiling coffee, at least one-third of the ground coffee comes to the top of the water, and collects all the way down from the cover to the surface of the water. By making the upper portion, $b$, cylindrical, the scraper and strainer may be readily and conveniently used, which it could not so be used if the upper portion was tapering, like the lower portion. The scraper $c$ is not used until the coffee is made and the pot placed on the table, when, by passing the scraper down, all the coffee collected on the inner surface of this upper portion of the pot will be forced down, and when the coffee is drawn off it will be strained and be perfectly free and clear.

The figures show a circular and a half-circular strainer. The first named, (represented by Fig. 4,) it will be noticed, has a bar, $d$, across its center, which, while it strengthens the strainer, also serves for passing it down and for holding it in place. The scraper and strainers, as is indicated by Figs. 2 and 3, are of cupped form.

In the ends of the bar $d$, and at diagonally-opposite points, are recesses $e$, which fit against wires $f$ in the pot, to guide down the scraper. Between the lower ends of the wires $f$ and the inner projection, $g$, of the pot, at the point of union of the two portions thereof, there is a small space, so that when down the scraper may be slightly turned, and the ends of the bars be pressed under the wires $f$, and thus the scraper be held in a locked condition. The inner projection, $g$, serves as a bearing or support to the strainer.

In the half-circular strainer grooves $h$, in the upright pieces of the handle, fit the wires $f$. Fig. 5 of the drawings indicates the line of the grooves and handle. In the circular scraper and strainer the handle $i$ is centrally attached.

What I claim as my invention, and desire to secure by Letters Patent, is—

1. In combination with the cylindrical portion of a coffee-pot, the scraper and strainer constructed and operated as herein set forth.

2. The combination of the bar $d$, having the recesses $e$, with the wires $f$ and projection $g$, for guiding and locking the scraper and strainer, as set forth.

WILLIAM WESTLAKE.

Witnesses:
DANIEL GOODWIN, Jr.
E. HURD.